(12) United States Patent
Reichmann et al.

(10) Patent No.: US 7,903,353 B2
(45) Date of Patent: Mar. 8, 2011

(54) LATERALLY ADJUSTABLE OPTICAL MOUNT WITH BENT LEVER MANIPULATOR UNITS

(75) Inventors: Lutz Reichmann, Jena (DE); Marco Bornschein, Jena (DE)

(73) Assignee: Jenoptik Optical Systems GmbH, Jena (DE)

( * ) Notice: Subject to any disclaimer, the term of this patent is extended or adjusted under 35 U.S.C. 154(b) by 0 days.

(21) Appl. No.: 12/485,224

(22) Filed: Jun. 16, 2009

(65) Prior Publication Data
US 2009/0316281 A1 Dec. 24, 2009

(30) Foreign Application Priority Data
Jun. 19, 2008 (DE) .......................... 10 2008 029 161

(51) Int. Cl.
*G02B 7/02* (2006.01)
(52) U.S. Cl. .......................... 359/813; 359/811; 359/830
(58) Field of Classification Search .......... 359/694–703, 359/811–824, 830
See application file for complete search history.

(56) References Cited

U.S. PATENT DOCUMENTS

| 5,488,514 | A | * | 1/1996 | Bruning et al. | 359/811 |
| 5,510,935 | A | * | 4/1996 | Whitty et al. | 359/822 |
| 7,242,537 | B2 | * | 7/2007 | Weber et al. | 359/811 |

FOREIGN PATENT DOCUMENTS

| DE | 281 031 A1 | 7/1990 |
| DE | 199 01 295 A1 | 7/2000 |
| DE | 100 51 706 A1 | 5/2002 |
| DE | 100 53 899 A1 | 5/2002 |
| DE | 10 2007 030 579 A1 | 1/2008 |
| EP | 1 577 693 A2 | 9/2005 |
| WO | WO 2005/101131 A1 | 10/2005 |

* cited by examiner

*Primary Examiner* — Mohammed Hasan
(74) *Attorney, Agent, or Firm* — Duane Morris LLP

(57) ABSTRACT

The present invention relates to an optical mount, in particular a lens mount, which is divided by a plurality of cuts in the mount material into a stationary outer mounting ring, a laterally adjustable inner mounting ring and three bent lever manipulator units which are offset by 120° relative to one another and which comprise a bent lever having a first element, one end of which is connected by way of a bent lever flexure hinge to one end of a second element, the other end of the first element being connected to the inner mounting ring, the other end of the second element being connected to the outer mounting ring, and with the first and second elements enclosing a bent angle smaller than 180°. By manipulating the three bent lever manipulator units, any center position of the inner mounting ring can be adjusted relative to the center of the outer mounting ring within an intended displacement range.

5 Claims, 4 Drawing Sheets

LATERALLY ADJUSTABLE OPTICAL MOUNT WITH BENT LEVER MANIPULATOR UNITS

FIELD OF THE INVENTION

The present invention relates to a monolithic optical mount, in particular a lens mount, which is divided by cuts in the material into a stationary outer mounting ring and a laterally adjustable inner mounting ring. A generic mount is known from EP 1 577 693 A2.

BACKGROUND OF THE INVENTION

DE 199 01 295 A1 discloses an optical imaging device in which the outer mount and an inner ring that can be adjusted relative to this outer mount are preferably integrally formed in one piece, i.e., as a monolithic unit. Between the inner ring and the outer mount, a manipulator device for the path-controlled displacement of the optical element, which is mounted in the inner ring in a direction perpendicular to the optical axis consists of a system of peripheral slots with connecting elements located between, a swivel joint and at least one adjustable joint with an adjusting element.

The drawback of this solution is that, in particular, because of the plurality of differently shaped configurations, these manipulator units, which in the document cited are called manipulator elements, have a complicated and unsymmetrical structure that is unsuitable for symmetrical systems, or can give rise to system instabilities. Specifically, the connecting elements, which have a stiffening effect in the direction of the optical axis but which are kinematically superfluous, increase the production costs and, depending on their number, require additional displacement forces and have the effect that deformations have a greater impact on the inner part. In addition, the swivel joints require an additional leaf-type spring and, in order to ensure the intended adjustment, must be moved in two directions that are oppositely oriented to each other, which requires pretensioning elements for both directions.

WO 2005/101131 A1 describes a lens mount, therein called a receiving assembly for positioning an optical element, comprising a first frame and three identical manipulator units, called holding units, which are equiangularly distributed along the circumference of the first frame and hold a second frame which supports a lens. The holding units are additional components, which, inter alia, lead to increased production and assembly costs. Thus, this is not a monolithic lens mount.

DE 100 51 706 A1 also discloses a mount which is divided by means of several cuts in the material into an inner mount and an outer mount, which remain connected to each other between the cuts in the material, said joints, in terms of the invention, being manipulator units. The cuts in the material are configured such that, when the connections are actuated by manipulators that act upon the connections, the inner mount, and consequently the mounted lens, can be axially moved, which mount, unlike the mount of the present invention, is therefore not a radially displaceable mount.

A lens mount that is integrally formed in one piece and thus is monolithic is also known from EP 1 577 693 A2. In a preferred embodiment, an inner ring is connected to an outer mount by way of three manipulator units, which in the document cited are called adjustable joints, each having two hinged brackets and an adjusting element between. To allow a lateral adjustment of the inner ring and thus of the optical element, actuators act on the swivel joints.

In contrast to DE 199 01 295 A1 mentioned above, the solution presented in this document is marked by a higher temperature stability.

As EP 1 577 693 A2 explains, when the optical element, e.g., a lens, is heated, the problem arises that it is very difficult for the heat to dissipate by way of the connections between the inner ring and the outer mount, of which there are only few, and those that exist are narrow. The resulting temperature differences have a negative effect on the imaging quality since, due to changes in the temperature, especially a change in length of the hinged brackets that extend in the same direction leads to a displacement of the inner ring in this same direction, which in turn leads to aberrations and comatic defects.

The lens mount according to EP 1 577 693 A2 avoids this problem mainly in that, in the tangential direction, the hinged brackets which are offset by 120° relative to each other act upon the outer peripheral area of the inner ring and on the inner peripheral area of the outer mount counterclockwise away from the inner ring. In this case, a change in the length of the hinged brackets is translated into a uniform direction of rotation. Rotations of this type do not lead to aberrations, especially not with a lens as an optical element.

A lens mount according to EP 1 577 693 A2 is also said to have the advantage that by shortening the hinged brackets, it is possible to increase the lateral stiffness of the inner ring connection, which has the effect that the lens mount with the lens mounted in it has a greater stiffness against vibrations inherent in the system. However, a higher lateral stiffness due to shortened hinged brackets is obtained at the expense of the sensitivity of the adjustment, which is determined not only by the length but also by the deflection of the hinged brackets.

The length of the hinged brackets, however, continues to be determined by the admissible material load. This means that if, at a preset adjustable movement and a preset sensitivity, the admissible material load is reached, the hinged brackets cannot be further shortened in order to increase the stiffness and inherent vibrations [sic]. Consequently, two relatively thin and, relative to the cross section, relatively long hinged brackets will always be required to ensure functionality as an adjusting unit or joint, which invariably limits the lateral and axial stiffness that can be reached.

DE 10 2007 030 579 A1 describes a first embodiment of a laterally adjustable lens mount which is essentially equivalent to a lens mount disclosed in EP 1 577 693 A2, which means that three manipulator units that are offset by 120° relative to one another are combined into a single element which, along its fixed end, transitions into two tangentially oriented hinged brackets, which in this document are called joining strips, which joining strips are connected to the inner mount section and the outer mount section.

In a second embodiment, the joining strips that connect the element to the inner and outer mount sections are radially oriented, which ensures a higher lateral stiffness.

However, when the lever is deflected by introducing, by way of a manipulator, a radially acting force into the free lever end, the resulting tensile loads in the radial joining strips are far greater than those in the tangential joining strips. Thus, the generation of undesirable tensions in the inner ring is unavoidable.

In both embodiments, the manipulator units are simple lever mechanisms, the transmission of which is determined by the length of the element and the deflection of the joining strips in the radial direction. To obtain a high sensitivity at the associated adjustable movements, the joining strips and/or hinged brackets are designed to be long, which can cause them to be subjected to torsional forces in the axial direction.

SUMMARY OF THE INVENTION

The problem to be solved by the present invention is to provide a monolithic mount which makes possible a highly sensitive adjustment of an optical element, in particular of a lens, that is mounted in an inner mounting ring, with the mount preferably having a high lateral and axial stiffness and with the inner mounting ring preferably having low tension.

This problem is solved by an optical mount with the features of Claim 1.

Useful embodiments and improvements follow from the dependent claims.

BRIEF DESCRIPTION OF THE DRAWINGS

The invention will be described in greater detail below by way of example in connection with the annexed drawings in which.

DESCRIPTION OF THE EMBODIMENTS

Figure 1:
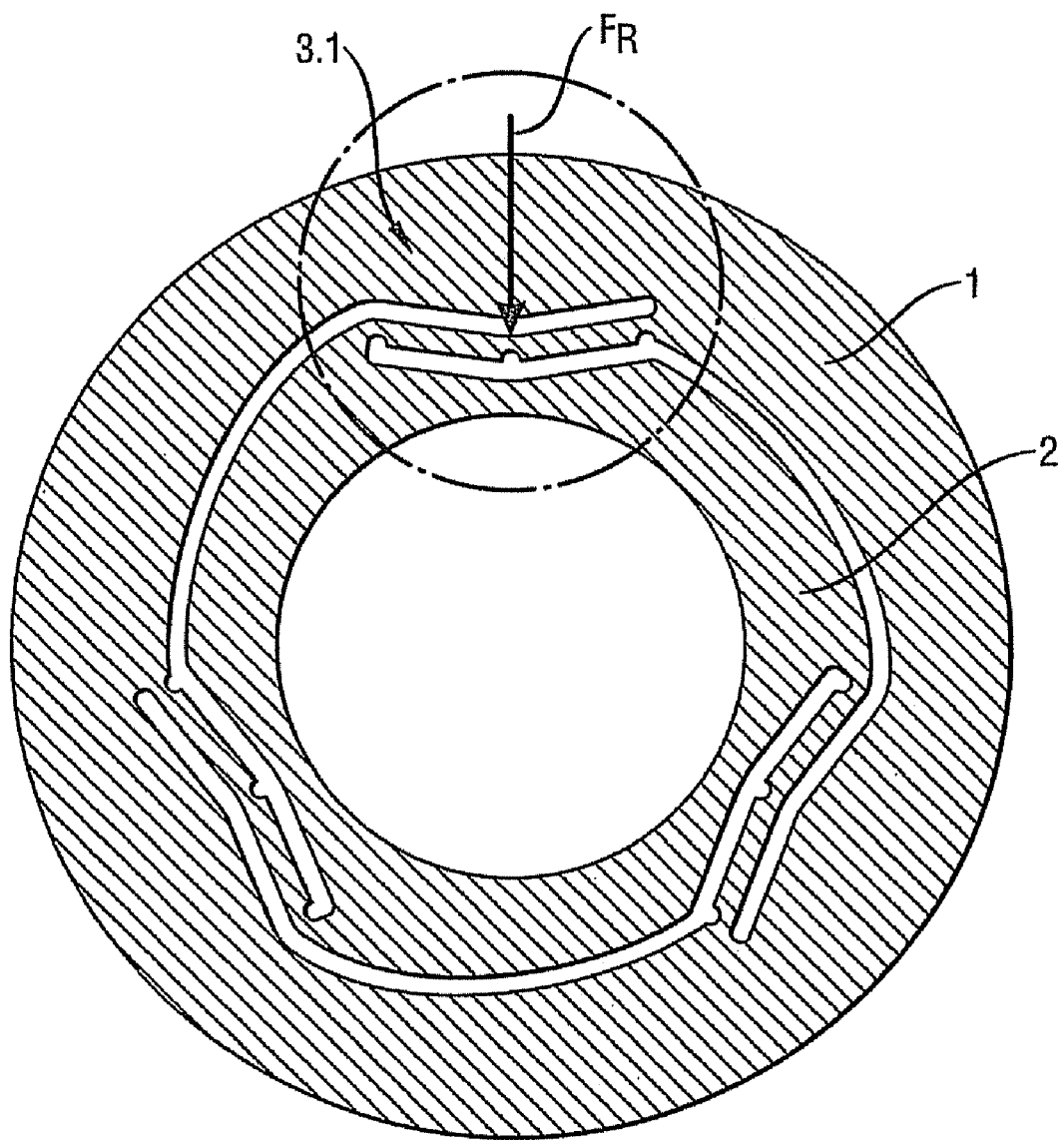
FIG. 1 is a top view of a mount according to the present invention with a first embodiment of a bent lever manipulator unit 3.1.

The monolithic optical mount according to the present invention shown in FIG. 1 is a lens mount. Like the prior-art mount known from EP 1 577 693 A2, it is fashioned from a rotationally symmetrical body and divided by several cuts in the material into a stationary outer mounting ring 1 and a laterally adjustable inner mounting ring 2.

The cuts in the material create three manipulator units that are offset by 120° relative to one another, by means of which the center of the inner mounting ring 2 can be laterally displaced, in a plane perpendicular to the optical axis of the lens, toward the center of the outer mounting ring 1 when an appropriate radially acting force $F_R$ is introduced that causes an adjustable movement at the point of application of force.

A mount according to the present invention differs from mounts known from the prior art in that the manipulator units, which are designed as bent lever mechanisms and which are hereinafter called bent lever manipulator units 3, have a special design.

FIG. 1 shows a lens mount with a first embodiment of a bent lever manipulator unit 3.1.

Figure 2A:
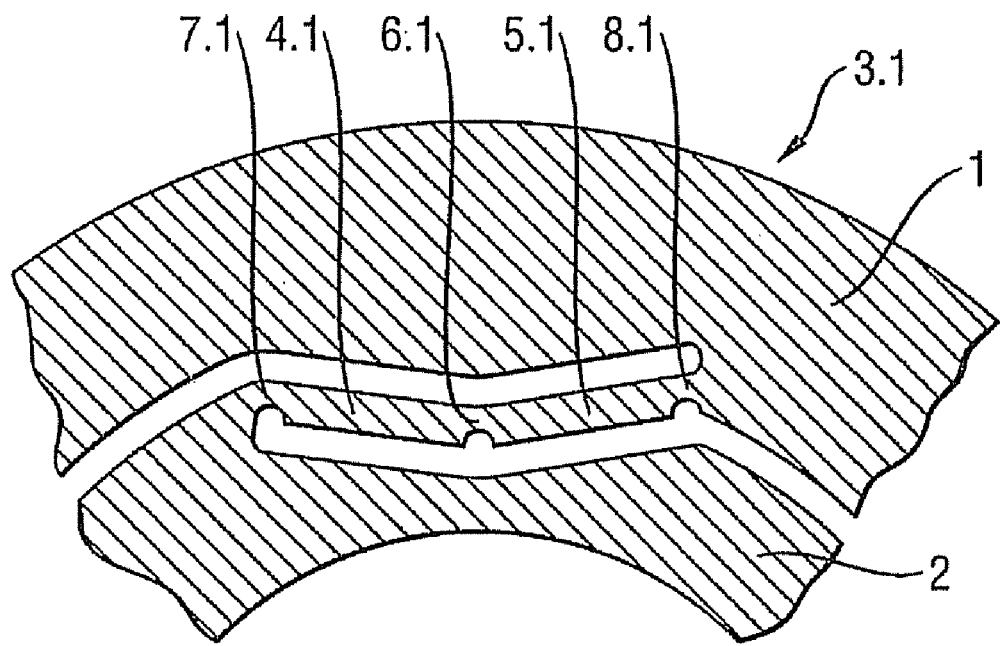
FIG. 2a is a sectional view through the first embodiment of a bent lever manipulator unit 3.1, and corresponds to the dotted line cut-out element depicted in FIG. 1.
Figure 3A:
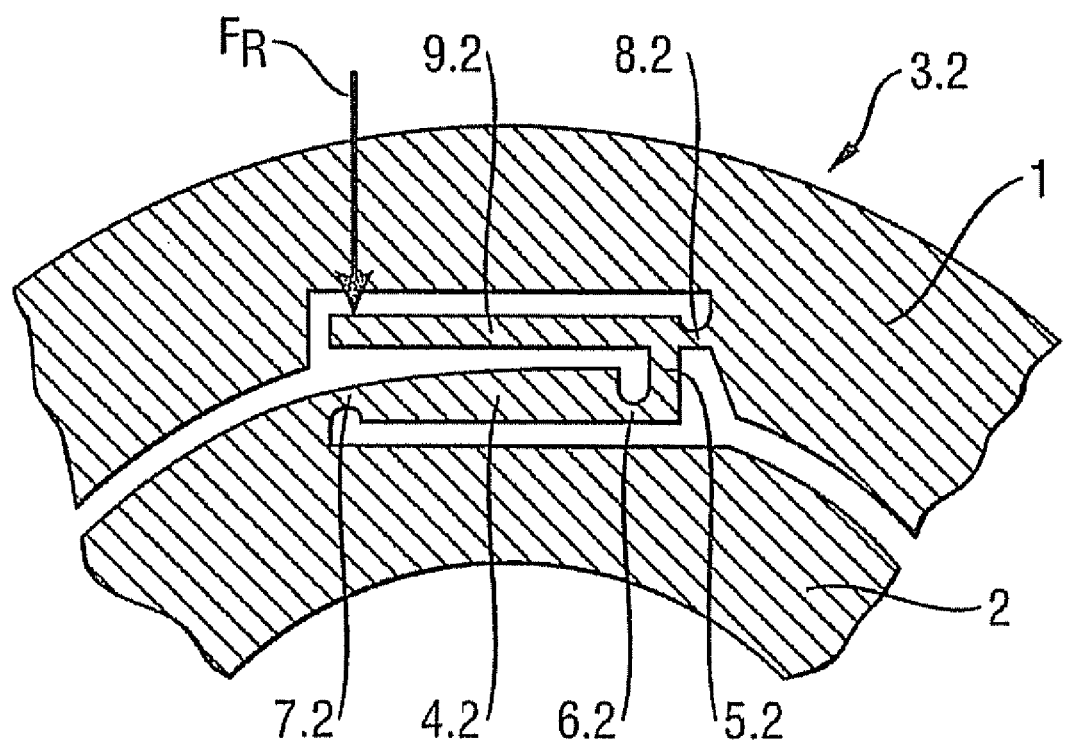
FIG. 3a is a sectional view through a second embodiment of a bent lever manipulator unit 3.2.
Figure 4A:
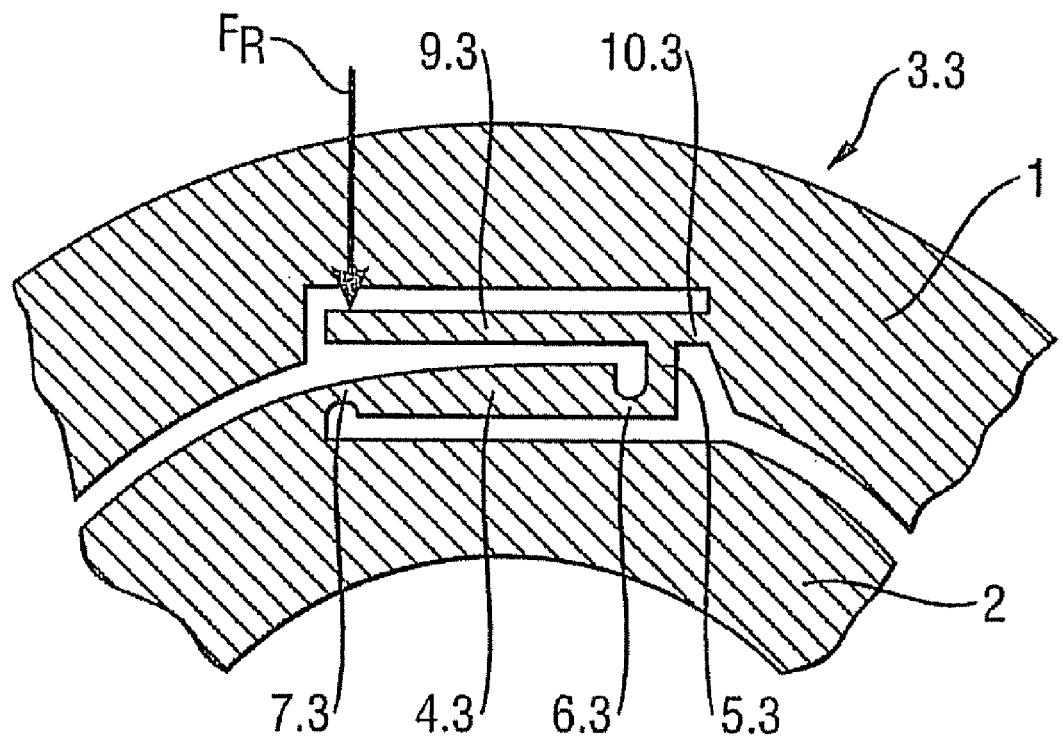
FIG. 4a is a sectional view through a third embodiment of a bent lever manipulator unit 3.3.

FIGS. 2a, 3a and 4a show sectional views of different embodiments of bent lever manipulator units 3.1, 3.2, 3.3 to better illustrate the different orientations of the cuts in the material.

Figure 2B:
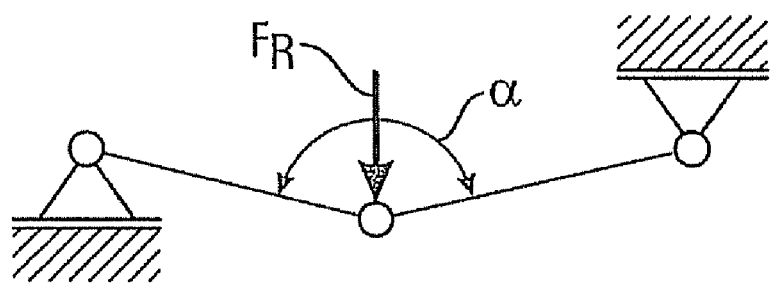
FIG. 2b is a force diagram for the first embodiment of a bent lever manipulator unit 3.1.
Figure 3B:
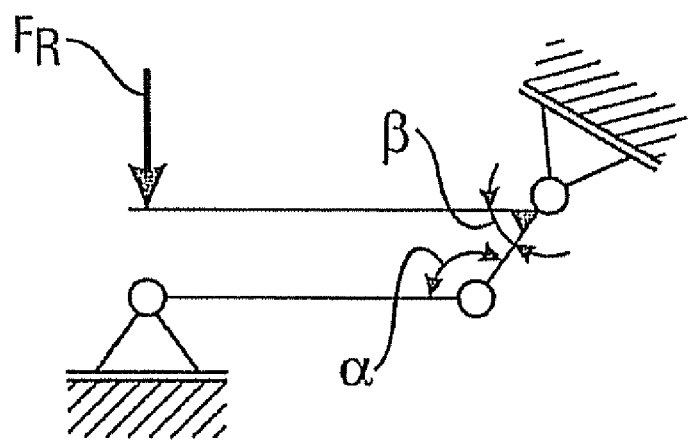
FIG. 3b is a force diagram for the second embodiment of a bent lever manipulator unit 3.2.
Figure 4B:
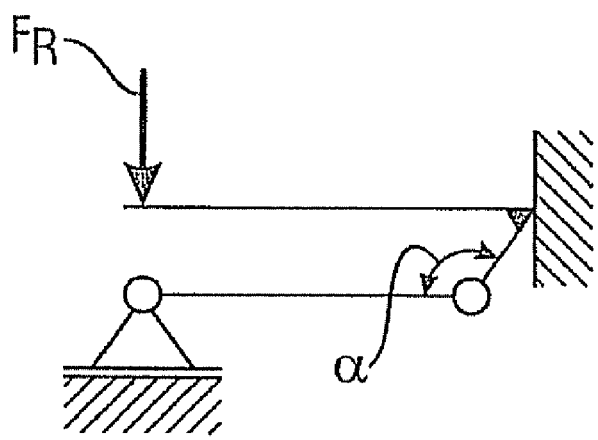
FIG. 4b is a force diagram for the third embodiment of a bent lever manipulator unit 3.3.

FIGS. 2b, 3b and 4b show the force diagrams associated with these units.

A first embodiment of a bent lever manipulator unit 3.1 which is shown in FIGS. 1, 2a and 2b comprises a bent lever with a first element 4.1 which is connected to a second element 5.1 by way of a bent lever flexure hinge 6.1.

Within the adjustable range of the bent lever, the first element 4.1 and the second element 5.1, in any position, form a bent angle α smaller than 180°, which angle changes with the adjustable movement, with bent angle α in the context of the present invention always identifying the smaller angle between the first elements 4.1 and the second elements 5.1.

The other end of the first element 4.1 is connected to the inner mounting ring 2 by way of a first flexure hinge 7.1.

The other end of the second element 5.1 is connected to the outer mounting ring 1 by way of a second flexure hinge 8.1.

In the embodiment shown, for example, the two elements 4.1 and 5.1 of the bent lever have the same length.

This first embodiment of a bent lever manipulator unit 3.1 is manipulated by actuators (not shown) which are oriented in the direction of the bent lever flexure hinge 6.1.

A second embodiment of a bent lever manipulator unit 3.2 which is shown in FIGS. 3a and 3b differs mechanically from the first embodiment 3.1 in that it has an additional lever 9.2 that is rigidly connected to a second element 5.2. The lever 9.2 and the second element 5.2 of the bent lever enclose a rigid angle β. Two flexure hinges 7.2, 8.2 and a bent lever flexure hinge 6.2 are configured in the same manner as the flexure hinges 7.1, 8.1 and the bent lever flexure hinge 6.1 of the first embodiment of a bent lever manipulator unit 3.1. An actuator (not shown) acts on the free end of lever 9.2.

In contrast to the second embodiment 3.2, the connection to the outer mounting ring 1 in the third embodiment of a bent lever manipulator unit 3.3, which is shown in FIGS. 4a and 4b, is different from the embodiments described so far.

In the previously described embodiments, this connection took the form of a second flexure hinge 8, i.e., the connection is tapered relative to the adjacent areas of the material. This taper can be formed by widening, within a locally limited area, one or both of the adjacent cuts in the material.

In the third embodiment of a bent lever manipulator unit 3.3, the connection to the outer mounting ring 1 is not tapered and is therefore not a mechanical element in the sense of a flexure hinge, but is instead a fixed constraint 10.3 for the additional lever 9.3 which is rigidly connected to a second element 5.3.

The design of a first flexure hinge 7.3, of a bent lever flexure hinge 6.3, and of a first element 4.3, which are comprised in the third embodiment of a bent lever manipulator unit 3.3, is identical to the design of the first flexure hinge 7.2, the bent lever flexure hinge 6.2, and the first element 4.2 of the second embodiment of a bent lever manipulator unit 3.2.

The mechanisms of action of the three previously explained embodiments of bent lever manipulator units 3 are identical in that each of the bent lever manipulator units 3 when actuated acts as a mechanical element while the other two form a fixed support.

If, on each first flexure hinge 7 of the fixed supports, one imagines a tangent to the inner mounting ring 2, the pole of the fixed supports is located at the point of intersection of the two tangents. By actuating the bent lever manipulator unit 3 which acts as a mechanical element, a movement of the center of the inner mounting ring 2 around the pole is initiated. Because of the very large distance between the pole and the actuated bent lever manipulator unit 3 and the comparatively very small displacement of the center of the inner mounting ring 2, it can be assumed that the movement, and thus the displacement, is approximately linear.

The transmission ratio between a generated adjustable movement at the point of application of a radial force $F_R$ and the displacement movement of the center of the inner mounting ring 2 with a bent lever manipulator unit 3 according to the present invention is determined by:

the deflection of lever 9
the bent angle α
the lengths of the first elements 4 and the second elements 5 and their length ratios
relative to one another and
the length ratio between the second elements 5 and lever 9.

In association with the two bent lever manipulator units 3 that serve as fixed supports, the transmission ratio is also determined by:

the length ratio between the distance from the pole of the first flexure hinge 7 of the bent lever manipulator units 3 that serve as a fixed support and the distance from the center of the inner mounting ring 2 of the first flexure hinge 7 of the bent lever manipulator units 3 that act as a mechanical element.

To actuate the first embodiment of a bent lever manipulator unit 3.1, a radial force $F_R$ which causes an adjustable movement is exerted on the bent lever flexure hinge 6.1.

In the other two embodiments of bent lever manipulator units 3.2, 3.3, the adjustable movement is caused by a radial force $F_R$ that acts on the free end of lever 9.

With the displacement of the inner mounting ring 2 proportional to the adjustable movement on a bent lever manipulator unit 3, the center of this ring describes a path line with a changing x and y excursion in a theoretical Cartesian coordinate system with coordinates originating in the center of the outer mounting ring 1.

By overlapping the paths of motion across all of the three bent lever manipulator units 3, any center position of the inner mounting ring 2 can be adjusted relative to the center of the outer mounting ring 1 within an intended displacement range. The adjustable movement and the displacement movement are typically within the μm range, and the transmission ratios are especially in a range from 1:10 to 1:20, with extremely high transmission ratios being possible when the bent angle α is approximately 180°.

The advantage of manipulator units in the form of a bent lever mechanism is, in particular, that the transmission ratio can be adjusted within wide limits by the choice of the bent angle α, on the one hand, and that these mechanisms, in contrast to the lever mechanisms known from the prior art, have a considerably higher longitudinal and transverse stiffness relative to the axis of the inner mounting ring 2 and the outer mounting ring 1, on the other hand. This ensures that the material weakening to the flexure hinges is reduced, while the stiffness-determining elements that serve as connections between the inner mounting ring 2 and the outer mounting ring 1 have a comparatively thick wall.

As to the achievable stiffness, the third embodiment of a bent lever manipulator unit 3.3 is especially useful since the connection to the outer mounting ring 1 does not have a weakening of the material. The inner mounting ring 2 is kept nearly tension-free across the entire range of movement since the tensions remain limited to the immediate environment of the flexure hinges 7,8. As a result, the inner mounting ring 2 is completely decoupled from the forces necessary for the manipulation.

The lengths and thicknesses of the levers and elements and the bent angle α in the tension-free state are chosen as a function of the dimensions of the lens mount and its material constants that determine a deflection so as to obtain a desired transmission ratio and thus the sensitivity desired for displacing a lens that is mounted in the inner mounting ring 2.

Similarly, the extent of the weakening of the material in the areas of the flexure hinges 7,8 created is a question of optimization.

The first embodiment of a bent lever manipulator unit 3.1 has the advantage that is requires only very little space.

The third bent lever manipulator unit 3.3 has been found to be the most useful embodiment of such a unit. It is marked by the highest sensitivity and stiffness.

LIST OF REFERENCE NUMERALS

1 Stationary outer mounting ring
2 Adjustable inner mounting ring
3.1 First embodiment of a bent lever manipulator unit
3.2 Second embodiment of a bent lever manipulator unit
3.3 Third embodiment of a bent lever manipulator unit
4.1 First element of a bent lever of a first embodiment of a bent lever manipulator unit 3.1
4.2 First element of a bent lever of a second embodiment of a bent lever manipulator unit 3.2
4.3 First element of a bent lever of a third embodiment of a bent lever manipulator unit 3.3
5.1 Second element of a bent lever of a first embodiment of a bent lever manipulator unit 3.1
5.2 Second element of a bent lever of a second embodiment of a bent lever manipulator unit 3.2
5.3 Second element of a bent lever of a third embodiment of a bent lever manipulator unit 3.3
6.1 Bent lever flexure hinge of a first embodiment of a bent lever manipulator unit 3.1
6.2 Bent lever flexure hinge of a second embodiment of a bent lever manipulator unit 3.2
6.3 Bent lever flexure hinge of a third embodiment of a bent lever manipulator unit 3.3
7.1 First flexure hinge of a first embodiment of a bent lever manipulator unit 3.1
7.2 First flexure hinge of a second embodiment of a bent lever manipulator unit 3.2
7.3 First flexure hinge of a third embodiment of a bent lever manipulator unit 3.3
8.1 Second flexure hinge of a first embodiment of a bent lever manipulator unit 3.1
8.2 Second flexure hinge of a second embodiment of a bent lever manipulator unit 3.2
9.2 Lever of a second embodiment of a bent lever manipulator unit 3.2
9.3 Lever of a third embodiment of a bent lever manipulator unit 3.3
10.3 Fixed constraint of a third embodiment of a bent lever manipulator unit 3.3
α Bent angle
β Angle
$F_R$ Radial force While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

The invention claimed is:

1. A laterally adjustable monolithic optical mount comprising a stationary outer mounting ring, a laterally adjustable inner mounting ring, and three manipulator units fashioned from a rotationally symmetrical body, said manipulator units being offset by 120° relative to one another, and said manipulator units forming actuators so as to be able to manipulate the manipulator units, wherein said manipulator units are formed by bent lever mechanisms, each manipulator unit comprising a bent lever having a first element which is connected by way of a bent lever flexure hinge at one end thereof to one end of a second element, the other end of said first element being connected to said inner mounting ring, the other end of the second element being connected to the outer mounting ring, and said first and second elements enclosing a bent angle smaller than 180°.

2. The laterally adjustable monolithic optical mount as in claim 1, wherein the connections between said first and second elements and the inner and outer mounting rings are flexure hinges.

3. The laterally adjustable monolithic optical mount as in claim 1, wherein the connections between the first element and the inner mounting ring are flexure hinges and the connections between the second element and the outer mounting ring serve as fixed constraints.

4. The laterally adjustable monolithic optical mount as in claim 1, wherein said actuators are oriented in the direction of the bent lever flexure hinges.

5. The laterally adjustable monolithic optical mount as in claim 1, wherein each of the second elements is rigidly connected to one end of a lever, thereby enclosing a rigid angle, and wherein each of said actuators is oriented in the direction of the free ends of said levers.

* * * * *